Sept. 5, 1939.                    L. F. ATHY ET AL                    2,172,271
                        METHOD OF ELECTRICAL PROSPECTING
                            Filed Jan. 10, 1938            5 Sheets-Sheet 1

INVENTORS
Lawrence F. Athy
Harold R. Prescott
BY Thos. E. Deofield
ATTORNEY

Fig. 3.

Sept. 5, 1939.  L. F. ATHY ET AL  2,172,271

METHOD OF ELECTRICAL PROSPECTING

Filed Jan. 10, 1938  5 Sheets-Sheet 3

INVENTORS
Lawrence F. Athy
Harold R. Prescott
BY
ATTORNEY

Patented Sept. 5, 1939

2,172,271

UNITED STATES PATENT OFFICE 2,172,271

METHOD OF ELECTRICAL PROSPECTING

Lawrence F. Athy and Harold R. Prescott, Ponca City, Okla., assignors to Continental Oil Company, Ponca City, Okla., a corporation of Delaware Application January 10, 1938, Serial No. 184,348

6 Claims. (Cl. 175—182)

Our invention relates to a method of electrical prospecting and more particularly to a method for geological investigation of tectonic formations.

Figure 1:
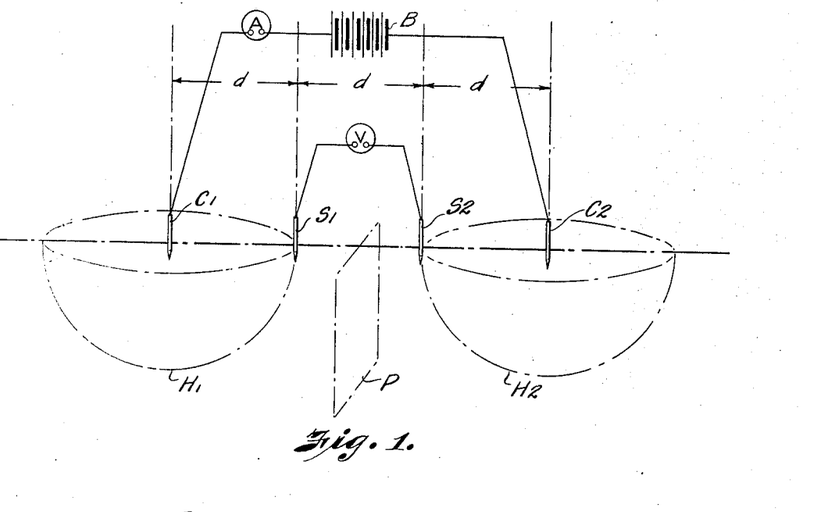
Figure 1 is a diagrammatic view illustrative of the theory and electrical measurement employed by the prior art.

Electrical resistivity methods of electrical prospecting are known to the art. Referring to Figure 1, if two conducting stakes $C_1$ and $C_2$ are driven into the ground and connected with a source of direct current potential B, an electric field is set up in the ground, the current flowing along all possible paths from one stake to the other. An equi-potential plane P may pass through the center of and perpendicular to the line joining the two stakes. Such a plane partitions the ground under examination into two similar halves each of which may be tested separately and thus compared with the other. Surrounding each current stake on either side of the central plane P are an infinite number of hemispheroidal equi-potential surfaces. The potential drop E between any one of these hemispheroids $H_1$ and $H_2$ and the central plane P is determined by the separation of the two current stakes $C_1$ and $C_2$ and their distance from the central plane P; the distance of the hemispheroid from the current stake and the central plane; and the nature of the material lying between the hemispheroid and the central plane. Either of the particular hemispheroids under determination is determined by stakes $S_1$ and $S_2$. If the distances $C_1S_1$ and $C_2S_2$ are always kept equal to one third of the distance $C_1C_2$ and, calling this distance $d$, then;

(1) $$E = \frac{I}{4\pi d} \cdot r$$

where $r$ is the average resistivity of the material between the hemispheroid in question and the central plane P, and I is the total current flowing in the circuit.

From this, transposing, one obtains;

(2) $$r = 4\pi d \frac{E}{I}$$

If $d$ is measured in feet, resistivity may be easily calculated from the following equation;

(3) $$r = 383 d \frac{E}{I}$$

The voltage E is measured by the voltmeter V and the current I is measured by the ammeter A. The distance may be measured readily and, by means of Equation 3 the resistivity may be calculated immediately. By changing the spacing of the current stakes and the potential pick-ups, a new value of $d$ is used and a new value of $r$ is obtained. It has been determined from experience that the change in $r$ is due largely to the material at a new depth. The changing values of $r$ with increasing depth and especially the differences between the resistivities at the same depth on the two sides of the central plane indicate the character of the beds being examined.

Among the earlier patents relating to the method of resistivity exploration is the patent to Conrad Schlumberger, U. S. Patent 1,163,468, bearing date December 7, 1915. The partitioning method of measurement outlined above is a method developed by F. W. Lee, J. W. Joyce, and P. Boyer, and described by them in "Some earth resistivity measurements" published in the Bureau of Mines Information Circular 6171, 1929. F. W. Lee and J. H. Swartz also described the method of measurement in their paper "Resistivity measurements of oil-bearing beds"; Technical Paper No. 488, Bureau of Mines, 1930. As pointed out, it is now well known that the electrical properties, such as resistivity and dielectric constant of geological strata tend to be more or less uniform along the bed but that the electrical properties of adjacent strata are often quite different. This variation of electrical properties is being used to identify the nature of geological strata. The changes in the resistivity $r$, with changes in the stake spacing $d$, may identify geological "marker" beds as measurements are carried laterally across the surface of the earth. The resistivity method above described is commonly known as the "potential" method.

Electro-magnetic methods of exploration consist essentially in determining the magnitude and vector direction of the horizontal magnetic field caused at the surface of the earth by current passed between two current electrodes or caused by current induced in the underlying geological beds by coils or loops on the surface of the earth.

Variations in dielectric constants consist essentially in measurements of the variation in capacity between two fixed plates having the earth as the effective medium between the two plates. The variations in the dielectric constant of the earth will be reflected in variations of capacity between the two fixed plates as the plates are moved from one place to another.

In electrical methods of prospecting, direct current or very low frequency alternating current is necessary in order to penetrate much below 2,000 feet. High frequency currents do not penetrate through the earth great distances. As lower frequencies are used, however, difficulties with instrumentation are increased. There is also an increase in difficulties with ground currents and magnetic storms. In order to reduce these factors, it has been suggested to use high current values for short intervals of time in order to allow the measurement of the effects from deeper strata to be sufficiently great so that they can be read over the random effects of ground currents. The use of high current density however, in the strata being measured introduces a fresh difficulty. Various strata exhibit irreversible electrolytic effects even though alternating current or pulsating direct current is employed. The irreversible electrolytic effects and ground currents have thus far tended to limit the depth of electrical prospecting and have reduced the accuracy of measurements at shallow depths. It will be obvious, therefore, that for deep lying strata the use of high current densities makes measurements questionable on account of irreversible electrolytic effects, and lower current densities cannot be used because of the effect of ground currents and magnetic storms. The use of direct current intensifies irreversible electrolytic effects since the current travels in one direction and results in polarization of the strata.

One object of our invention is to provide a method and apparatus enabling the use of electrical methods of prospecting at greatly increased depths.

Another object of our invention is to provide a method and means of electrical prospecting of great sensitivity.

Another object of our invention is to provide a method and means for electrical prospecting which will allow the use of smaller current densities and smaller potentials.

Another object of our invention is to provide a method of electrical prospecting employing a low fixed frequency, the apparatus being such that it is non-responsive to higher frequencies than or lower frequencies than the fixed frequency.

Another object of our invention is to provide a method and apparatus for electrical prospecting which will be less susceptible to ground currents and magnetic storms.

Another object of our invention is to provide a method and apparatus for electrical prospecting in which a desired frequency is selected for the source excitation in which the recording apparatus is responsive to a selected frequency, but non-responsive to lower and higher frequencies.

In the accompanying drawings which form part of the instant specification and are to be read in conjunction therewith and in which like reference numerals are used to indicate like parts in the various views.

In general, our invention contemplates the use of a low frequency current having a good wave form in which the transmitter employs a current of a single frequency and a receiver having a high pass filter and a low pass filter, enabling the rejection of currents higher in frequency than the exciting source and of currents lower in frequency than the exciting source, followed by the amplification of the filtered current with its subsequent recording upon a record strip or by readings of the current flow and the voltage employed from which resistivity may be calculated and plotted. It is understood, of course, that the distance $d$ represents depth as will readily be appreciated by reference to Figure 1. The increase of the distance $d$ results in readings being taken at greater depth.

Figure 2:
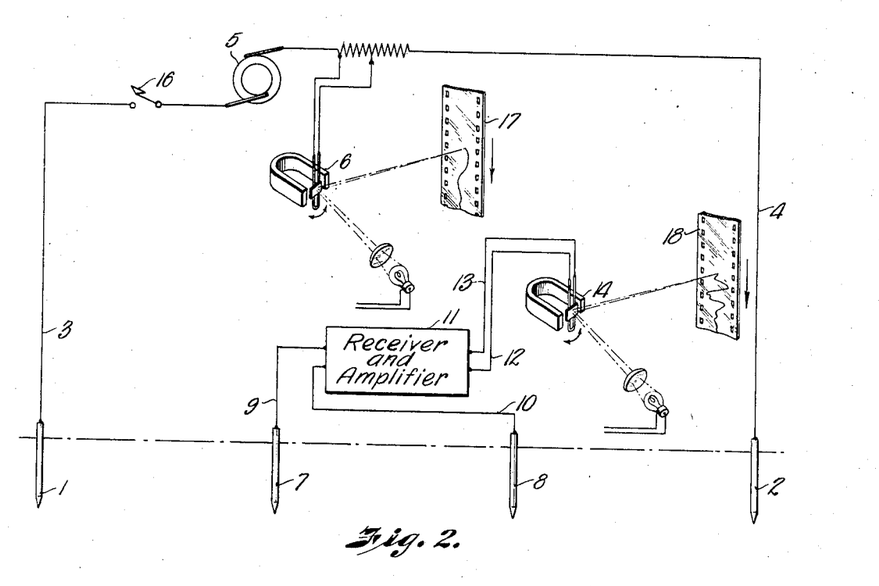
Figure 2 is a diagrammatic view of apparatus capable of carrying out the method of our invention.

More particularly referring now to the drawings, with special reference to Figure 2, stakes $1$ and $2$ are conducting stakes or electrodes corresponding to stakes $C_1$ and $C_2$ in Figure 1. These are connected by conductors 3 and 4 to an alternator 5 shown diagrammatically. A galvanometer 6 is adapted to measure the current flowing in the circuit. Current stake 7 corresponds to stage $S_1$ and current stake 8 corresponds to stage $S_2$ in Figure 1. These are connected by conductors 9 and 10 to a receiver and amplifier shown diagrammatically at 11. The output of the amplifier is a function of the voltage received and is led by conductors 12 and 13 to an oscillograph or galvanometer shown diagrammatically at 14. The readings of galvanometers 6 and 14 may be read and the results plotted for various depths represented by the interstake spacing. A key 16 is adapted to momentarily close the circuit in order to obtain transient effects, in which case the oscillographs 6 and 14 record the effects upon record strips 17 and 18.

Figure 3:
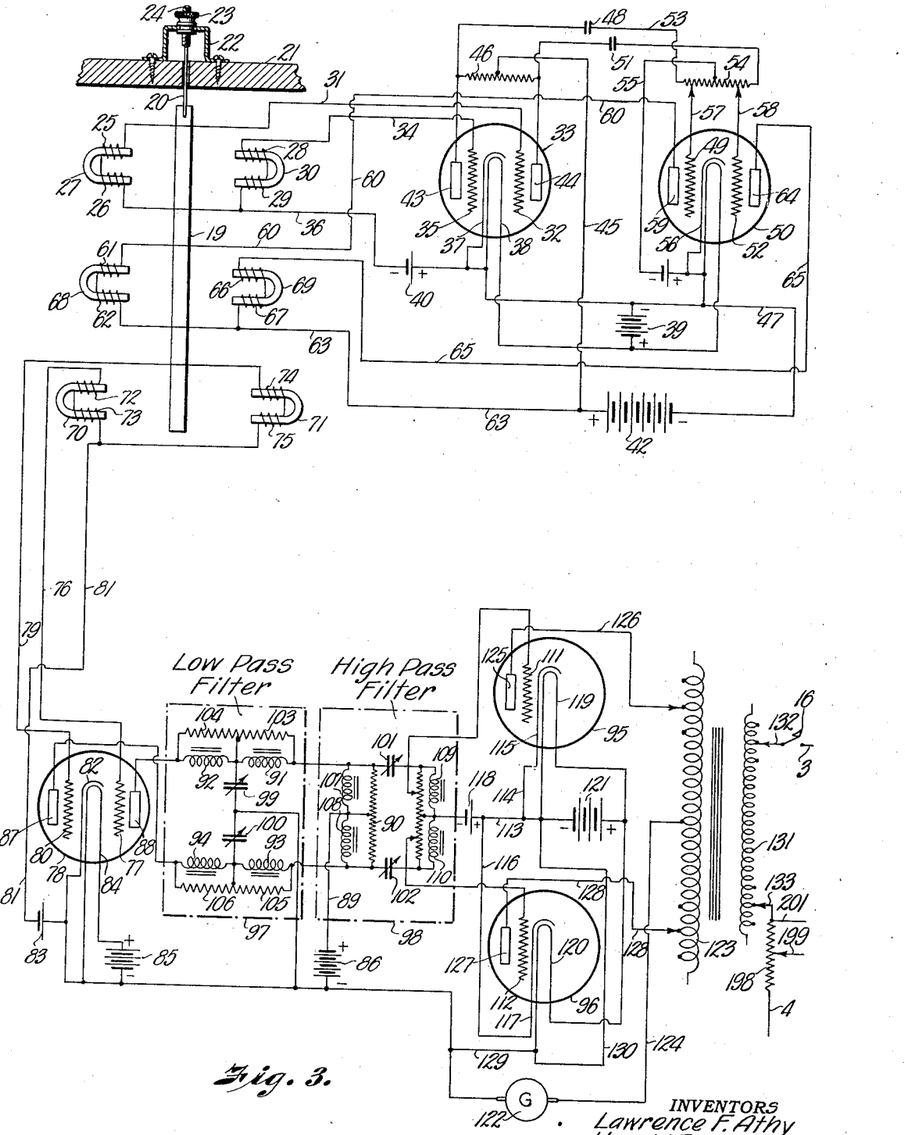
Figure 3 is a schematic view showing the exciting source of alternator used in carrying out the method of our invention.

The alternator 5 is shown in Figure 3, it being understood that, while the showing is a suitable source for alternating current of low frequency, any other suitable source known to the art may be employed in the combination and in carrying out the method of our invention. The alternator shown in Figure 3 is suitable for very low frequencies such as five cycles per second and at the same time may be employed for frequencies as high as five hundred cycles per second. A vibrating member 19 is carried by a flexible spring member 20 from any suitable support 21 by means of an adjusting arrangement 22. The natural frequency will be determined by the length and shape of the vibrating member 19 and by the length and stiffness of the flexible spring suspension 20. The length of the spring suspension 20 may be varied by adjusting nut 23, raising or lowering the member 19 by means of threaded member 24 as can readily be appreciated by reference to Figure 3. Coils 25 and 26 are wound around a small permanent magnet 27. Coils 28 and 29 are wound around a small permanent magnet 30. The coils 25, 26, 28, and 29 are exciting coils which develop a voltage as the vibrating member 19 oscillates. This voltage is induced in the windings when the external field of the magnet is altered by the member 19 alternately coming closer and then farther away from the coils, it being understood, of course, that the member 19 is of magnetic material or a member carrying pieces of magnetic material attached to the sides, which magnetic material is adapted to alter the external field of the small magnets 27 and 30. The voltage induced in the exciting coils 25 and 26 is led by conductor 31 to one grid 32 of a thermionic tube 33. The voltage induced in coils 28 and 29 is impressed by conductor 34 upon the grid 35 of the thermionic tube 33, the return portion of the circuits being comprised by conductor 36 which is connected to the cathode 37 of the tube 33. The cathode 37 is heated by a filament heater 38 to which current is supplied from a battery 39. A battery 40 furnishes bias voltage for the grid. A battery 42 supplies positive potential to the plates 43 and 44 of the tube 33, through a conductor 45 and center tapped resistance 46, the return in the plate circuit being from the negative terminal of the battery 42 through conductor 47 to cathode 37. Plate 43 is coupled by condenser 48 to the grid 49 of thermionic tube 50. Plate 44 is coupled by condenser 51 to the grid 52 of the tube 50. The other side of condenser 48 is connected by conductor 53 to one end of a resistance 54. The other side of condenser 51 is connected to the oposite end of the resistance 54. The resistance 54 is center tapped by a conductor 55 connected to cathode 56 of tube 50. Conductor 57 adjustably connects grid 49 to the resistance 54, while conductor 58 adjustably connects grid 52 to the resistance 54. The adjustment of conductors 57 and 58 controls the output of tube 50 acting as a volume control. The plate 59 of the tube 50 is connected to the positive terminal of battery 42 through conductor 60, windings 61 and 62, and conductor 63. The plate 64 of the tube 50 is connected to the positive terminal of battery 42 by conductor 65, windings 66 and 67, and conductor 63. The windings 61 and 62 are about a soft iron electromagnet core 68. The windings 66 and 67 are about a soft iron electromagnet core 69. The windings 61, 62, 66, and 67 are driving windings. The output of tube 50 is controlled to supply sufficient energy to keep the member 19 in oscillation. The driving electromagnets 68 and 69 are positioned as far as possible on each side of oscillating member 19 and still maintain oscillation. This reduces damping caused by residual magnetism of the cores and allows member 1 to oscillate as freely as possible. The amplitude of motion of vibrating member 19 is quite low in order that the motion may be as free of harmonics as possible. Mounted on each side of oscillating member 19 are small permanent magnets 70 and 71. Windings 72 and 73 are disposed about the poles of magnet 70. Windings 74 and 75 are disposed about the poles of magnet 71. As the member 19 of magnetic material vibrates, driven by driving electromagnets, as described above, it will alternately approach and recede from each of the small permanent magnets 70 and 71, varying the external magnetic field and inducing voltages in the windings 72 and 73, and 74 and 75. The pickup windings 72, 73, 74, and 75 are well separated from the vibrating member 19, are balanced and adjusted to have as nearly as possible a linear relationship between changes in the external flux of the small mangets with changes in the position of the vibrating member 19. This will give induced electrical voltages substantially as free of harmonics as the motion of vibrating member 19. The voltages induced in windings 72 and 73 are impressed by conductor 76 upon one grid 77 of thermionic tube 78. The voltages induced in windings 74 and 75 are impressed by conductor 79 upon another grid 80 of the tube 78, the return circuits being completed by conductor 81 to cathode 82 of tube 78. The cathode is biased by a "C" battery 83. The cathode is provided with a filament heater 84 to which current is supplied from an "A" battery 85. Positive potential from "B" battery 86 is supplied to the plates 87 and 88 of the tube 78 through conductor 89, center tapped resistance 90 and respective groups of choke coils 91, 92 and 93, 94, as can readily be seen by reference to Figure 3. The thermionic tube 78 will amplify the induced voltages generated in windings 72, 73 and 74, 75. The amplified voltage is passed to thermionic tubes 95 and 96 for further amplification through a low pass filter 97 and a high pass filter 98. The condensers 99 and 100 of the low pass filter are set to reject frequencies higher than the fundamental of the vibrating member 19. The condensers 101 and 102 of the high pass filter are adjusted to reject frequencies lower than fundamental of vibrating member 19. In parallel with choke coil reactances 91 and 92 of the low pass filter are resistances 103 and 104. In parallel with choke coil reactances 93 and 94 are resistances 105 and 106. Resistances are also placed in parallel with each choke coil reactance 107, 108, 109 and 110 of the high pass filter 98. These inductances 107, 108, 109 and 110 must be quite large in order to provide a peak response at the low frequencies used. The resistances are of such value that the network is well damped in order that electrical oscillations will not be generated, enabling the natural frequency of the vibrating member 19 to be reproduced faithfuly in wave form. In this connection, it is unimportant whether or not phase change occurs.

The output of the high pass filter is impressed upon the grids 111 and 112 of tubes 95 and 96, the return circuits being completed through common conductor 113 and conductor 114 to cathode 115 of tube 95 and conductor 116 to cathode 117 of tube 96, a biasing "C" battery 118 being provided. The tubes 95 and 96 are of the indirectly heated cathode type and are provided with filament heaters 119 and 120, respectively, which are supplied energy from an "A" battery 121. "B" power is supplied to the plate circuits of tubes 95 and 96 by a generator 122. The output of tubes 95 and 96 is connected to the primary winding 123 of the transformer, the power being supplied through conductor 124 to a center tap of the primary 123. Plate 125 of tube 95 is adjustably connected by conductor 126 to taps at one end of the primary 123. Plate 127 of tube 96 is adjustably connected by conductor 128 to taps at the other side of primary 123. The other side of the generator 122 is connected to cathodes 119 and 120 by conductor 129, the cathodes being interconnected by conductor 130.

The transformer of which winding 123 is a primary must be made with good iron and a high primary inductance in order to efficiently deliver energy at the low frequencies desired and in order to be as free of harmonics as possible. The secondary winding 131 is adapted to conduct the output energy of the alternator to the ground stakes through conductors 3 and 4. The conductors are connected to the secondary winding 131 of the transformer by adjustable connections 132 and 133. It is desirable to have these connections adjustable in order to properly match the impedance of the load circuit to the impedance of the plate circuits of tubes 95 and 96.

For higher frequencies, the spring 20 may be discarded and the vibrating member 19 may be clamped in the mounting or a tuning fork may be used as the vibrating member. When higher frequencies are used, the harmonics are less and the low pass filter and the high pass filter may be eliminated.

As mentioned hereinabove, there are other sources of alternating current with fairly good wave form known to the art which may be used. The well known beat oscillators using push-pull detection and push-pull amplification can be designed to have a very low harmonic content to frequencies as low as fifteen or ten cycles per second if the circuits are well separated by buffer stages. Buffer stages can be used in connection with the alternator shown in Figure 3 where the load delivered by the power stage is great. In this case, a buffer stage will be placed between the thermionic tube 78 and the output tubes 95 and 96.

The above variations are known to the art and may be used in carrying out the method of our invention.

Figure 4:
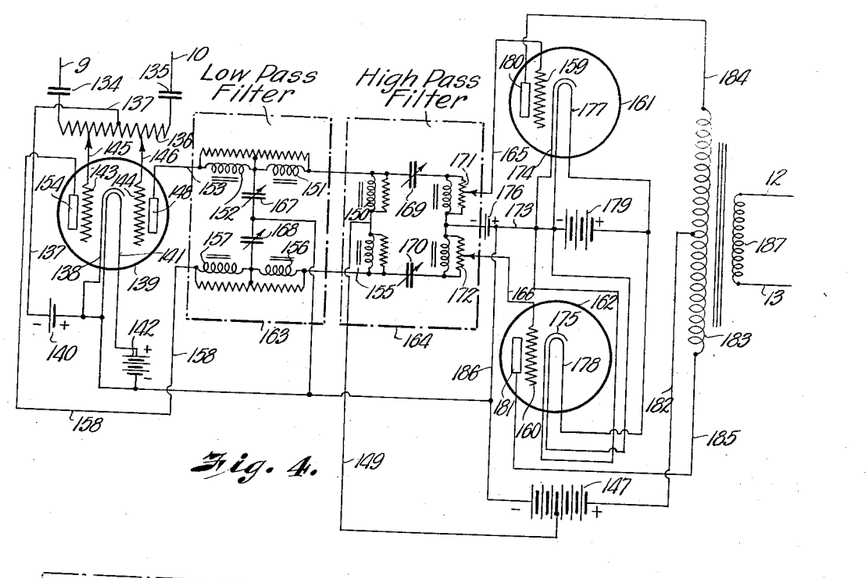
Figure 4 is a diagrammatic view of a receiver and amplifier capable of carrying out the method of our invention.

The filtered low frequency potential is impressed by conductors 3 and 4 upon current stakes 1 and 2. The key 16 may be closed and continuous current passed for a sufficient time to enable readings of the current and voltage to be taken. The voltage received is picked up from current stakes 7 and 8 and carried by conductors 9 and 10 to a receiver and amplifier which is shown in Figure 4. The potential is received through condensers 134 and 135 and impressed at the ends of a resistance 136. The resistance 136 is center tapped by a conductor 137 which is connected to the cathode 138 of a thermionic tube 139, the usual "C" battery 140 being used to bias the grid. The cathode 138 is provided with a filament heater 141 to which energy is supplied by means of an "A" battery 142. The grids 143 and 144 of the tube 139 are connected to the resistance 136 by adjustable conductors 145 and 146. The adjustment of these conductors acts as a volume control and varies the potential impressed upon the grids 143 and 144. Voltage from "B" battery 147 is impressed upon plate 148 of tube 139 through conductor 149, reactance 150, reactance 151, reactance 152 and conductor 153. Voltage from the "B" battery 147 is impressed upon the plate 154 through conductor 149, reactance 155, reactance 156, reactance 157 and conductor 158. The output of thermionic tube 139 is impressed upon the grids 159 and 160 of tubes 161 and 162 through a low pass filter 163 and a high pass filter 164 through conductors 165 and 166.

The condensers 167 and 168 of the low pass filter are set to reject frequencies higher than the frequency selected to be impressed upon the current electrodes. The condensers 169 and 170 of the high pass filter are set to reject frequencies lower than the source frequency. It will be noted that each of the reactances in both filters is provided with resistances connected in parallel therewith to provide electrical damping of the entire network enabling the reproduction of the fundamental frequency of the source faithfully. It will be noted that conductors 165 and 166 connecting the output of the high pass filter to the respective grids 159 and 160 may be adjusted upon the resistances 171 and 172 to act as a further means for controlling the overall amplification. By means of the filters, the amplifier delivers a reproduction of the potential at the potential electrodes with stray effects such as ground currents, electrolytic effects and variable resistance at the electrode conductors materially suppressed.

It will be clear to those skilled in the art that less current may be used for a given depth of investigation and that the range of investigation as to depth may be materially increased. Furthermore, the records produced at all depths are materially clarified and camouflaging effects pointed out above reduced. The grids 159 and 160 return circuits are completed through conductor 173 and respective cathodes 174 and 175, a customary "C" biasing battery 176 being provided. Filament heater 177 of tube 161 and filament heater of tube 162 are supplied current by "A" battery 179. Plate 180 of tube 161 and plate 181 of tube 162 are connected to the positive terminal "B" battery 147 through conductor 182 which is connected to a center tap of the primary 183 of the output transformer. The opposite ends of the primary winding 183 are connected respectively by conductors 184 and 185 to plates 180 and 181 of tubes 161 and 162, and the plate circuit is completed through respective cathodes 174 and 175 through conductor 186 to the negative terminal of the "B" battery 147. The secondary winding 187 of the output transformer impresses the voltage received through conductors 12 and 13 upon a measuring device such as an oscillograph, vacuum tube voltmeter or the like.

It will be understood that it is normally desirable to make measurements in terms of known quantities. This can be easily accomplished by calibrating the amplifier with its measuring means at the time of field use. By connecting the input leads 9 and 10 of the amplifier to a source of known voltage, the volume control connections 145 and 146, and 171 and 172 may be adjusted to give the desired overall sensitivity.

Figure 5:
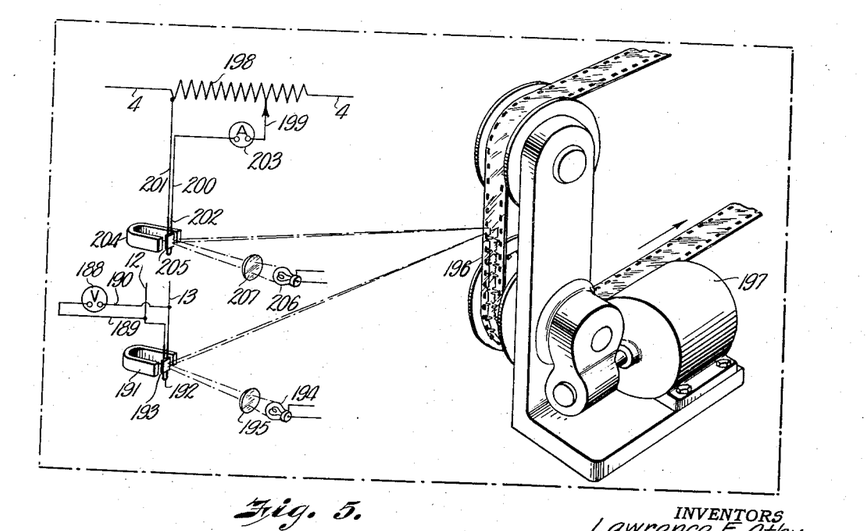
Figure 5 is a diagrammatic view of a recorder capable of carrying out our invention.

Referring now to Figure 5, the voltmeter 188 may be of any desired type such as a vacuum tube voltmeter and is connected across output leads 12 and 13 by means of conductors 189 and 190. The oscillograph 14 may comprise a field magnet 191 and an oscillograph element 192 which is well damped so as to produce low frequencies faithfully in wave form and phase. A mirror 193 is carried by the oscillograph element 192. An incandescent light 194 is projected by a lens 195 upon the mirror 193 for reflection upon a light sensitive medium 196 provided with any suitable means such as an electric motor 197 for moving the light sensitive medium past the light spot reflected by mirror 193. A similar oscillograph is employed for recording the current impressed at the current stakes 1 and 2. A resistance 198 is placed in one of the output leads 4 going to one of the stakes. The resistance is tapped by a variable arm 199. It will be readily apparent that the leads 200 and 201 across the resistance will reflect the current flowing from the current source. The oscillograph element 202 will measure the voltage across the resistance. Since the resistance is fixed, the voltage across the resistance will vary as a function of the current. A direct reading of current may be made on ammeter 203 which may be of any suitable type. The oscillograph element 202 is supported within the field of magnet 204 and carries a mirror 206 upon which light from an incandescent lamp 205 is projected by lens 207. The mirror 206 reflects the light upon the sensitized film 196 in side by side relation with the light beam from oscillograph element 192. The oscillograph elements 192 and 202 are quite high in natural frequency and for the frequencies recorded by them, may be regarded as practically without inertia. If the key 16 be closed momentarily and released, the transient effects will be recorded upon the sensitized strip 196. The transient effects may be measured for a very short period of time by means of the photographic recording equipment. The filters will contribute some transient distortion and some phase shift. This, however, may be disregarded since comparative measurements are made from one place to another using the same adjustments. The difference in the measurements obtained will still be a valuable index and will serve almost as well as a faithful reproduction. This is true because, in geophysical exploration work, the differences in measurements are indicative of changes in geological structure.

Figure 6:
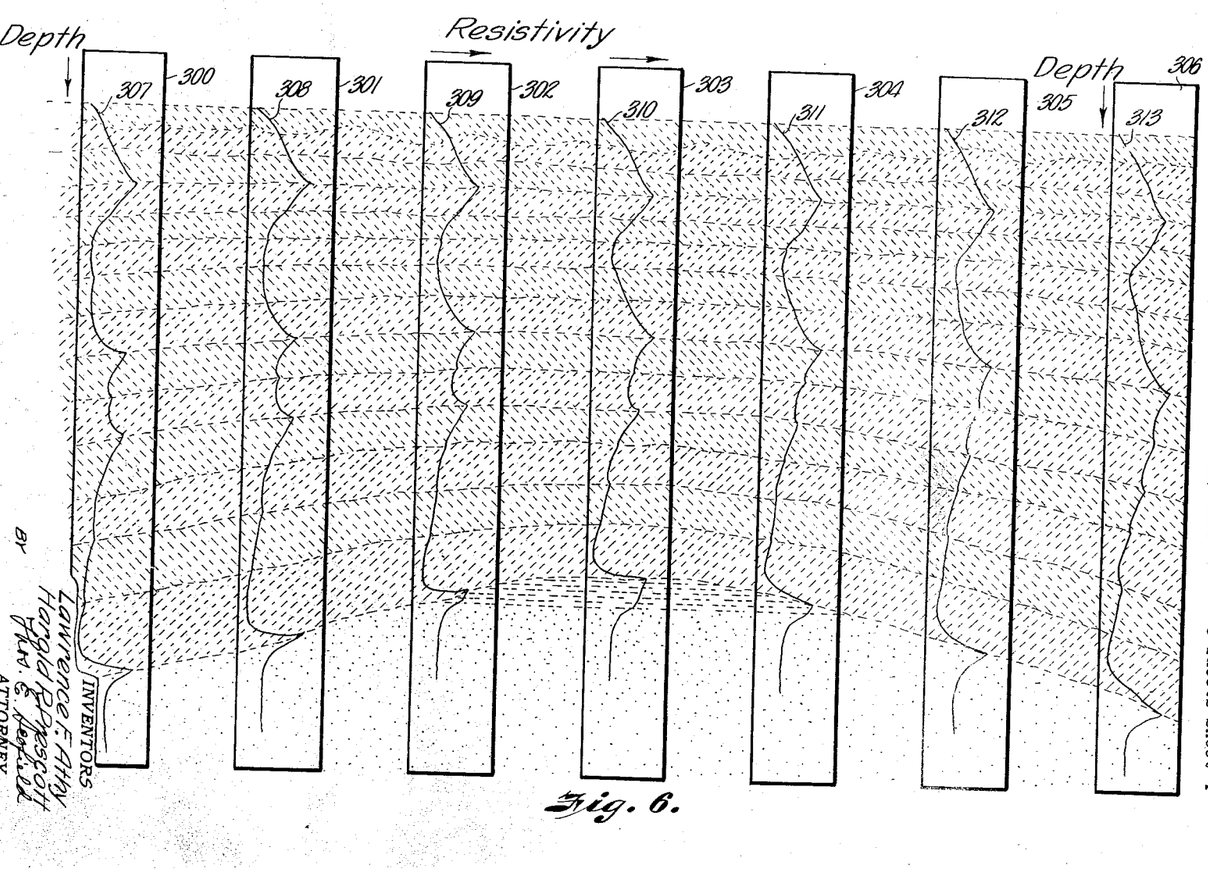
Figure 6 is a diagrammatic view showing the correlation of plots to depict a geological section in which the plots are made.

In operation, the current stakes 1, 7, 8, and 2 are spaced so that the interstake distance is the same. This interstake distance may be considered as depth at which a reading is being taken. In one mode of operation, the key 16 is closed and the current flowing to the current stakes 1 and 2 is read. The voltage received from current stakes 7 and 8 at the particular instant and for the conditions of the setup is also read. The resistivity is then plotted upon a plotting sheet. A plurality of these plotting sheets, 300, 301, 302, 303, 304, 305, and 306, are shown in Figure 6 against a phantom background of the structure over which they were taken. On each plotting sheet, resistivity is plotted against depth to produce the curves 307, 308, 309, 310, 311, 312, and 313 as can readily be seen by reference to Figure 6. It will be seen that the curves exhibit similar characteristics but that salient features of the curves, that is, the peaks of resistivity, are spaced at various depths. The respective points along the earth's surface at which readings are taken, that is, the point symmetrical to the spacing of the stakes which would be a point upon the central plane P of Figure 1, determine the spacing of the respective plotting sheets. It will readily be seen that, by connecting the peaks and troughs or other identifiable characteristics of the curves, a geological profile can be drawn. This profile is indicated in dotted lines in Figure 6. One peculiar advantage of resistivity methods of geophysical exploration over the other known methods, that is, the gravitational, seismic and magnetic methods, is that the presence of oil and gas can be readily detected. It will be noted that opposite the oil bearing strata, that is, in the oil sand, the resistivity curve is at peak. The peak of resistivity is quite marked in most cases and clearly indicates the presence of a substance of high resistance such as oil or gas. The presence of water and metallic ores, for the location of which our method is likewise adaptable, will be indicated by accentuated drops in resistivity or by troughs in the curves.

If a hole is drilled at one of the points at which readings are taken and a bore hole log of resistivities made, it will be found that the curve obtained will be analogous in character to the curve obtained at the surface so that each of the plotting sheets may be considered in effect a bore hole log made without the necessity of obtaining a bore hole.

Figure 7:
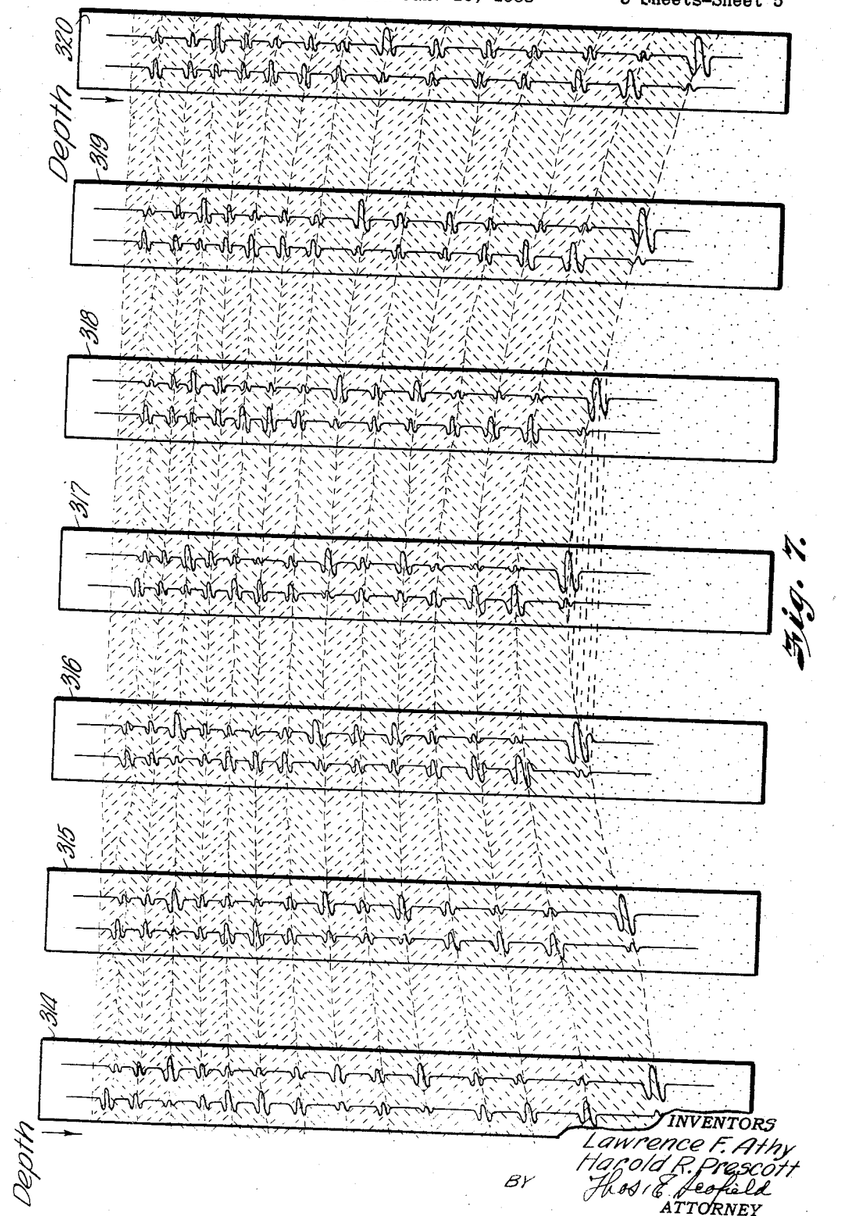
Figure 7 is a diagrammatic view, similar to Figure 6, of a geological section correlated with an assembly of record strips made with transient currents.

With each setup, in order to check the plotting sheets, transient readings are taken. A transient reading is taken by shutting the key 16 momentarily and opening it, the recording in such case being taken photographically to obtain a series of curves showing the alternating current flowing through current stakes 1 and 2, and the alternating voltage received at current stakes 7 and 8. The curves of transients are positioned on plotting sheets 314, 315, 316, 317, 318, 319 and 320, according to the depth at which the transients were recorded and the plotting sheets placed upon a profile plotting sheet with each of the respective transient curve plotting sheets at positions corresponding to the central planes at which the readings were taken. Each pair of transients will exhibit identical characteristics enabling the drawing of a profile such as shown by dotted lines in Figure 7. This profile should check with the profile obtained from the plotting sheets of resistivity curves and is an additional check upon observations. Frequently, geological horizons have peculiar characteristics resulting in rapid damping of the transients. Other horizons have different damping characteristics. Frequently, phase changes occur. Similar geological horizons have similar characteristics. The peculiarities in amplitude, damping and phase change furnish further markers enabling identifications of the respective horizons. When using transient effects, plotting sheets similar to those shown in Figure 6 may be calculated, giving an additional series of plotting sheets, which may be correlated so that accurate knowledge of structure may be obtained by means of our method.

It will be seen that we have accomplished the objects of our invention. We are enabled to make potential measurements employing a much smaller current at the current electrodes. The camouflaging effects of electrical storms, electrolytic effects and stray ground currents are minimized due to the fact that greater range of observation is possible with less exciting voltage. Smaller equipment may be employed, rendering it more easily portable. Frequencies as low as five cycles per second and as high as five hundred cycles per second may be employed, depending upon the localities in which observations are made. A plurality of various frequencies may be tried in a locality to determine that with which the best records are obtained and these frequencies may be employed in that particular locality. By means of our arrangement, a low frequency exciting source is possible. It has not been heretofore possible, because of the masking effects hereinabove pointed out.

It will be understood that certain features and subcombinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of making geological explorations including the steps of passing an alternating current of predetermined frequency through the earth between two separated points adjacent the surface of the earth, receiving the potential difference between two points adjacent the earth's surface lying between said current source points, rejecting alternating potentials higher in frequency than the predetermined frequency, measuring the remaining potential difference and simultaneously measuring the alternating current being passed through said separated points adjacent the earth's surface.

2. A method of making geological explorations including the steps of passing an alternating current of predetermined frequency through the earth between two separated points adjacent the surface of the earth, receiving the potential difference between two points adjacent the earth's surface lying between said current source points, rejecting alternating potentials lower in frequency than the predetermined frequency, measuring the remaining potential difference and simultaneously measuring the alternating current being passed.

3. A method of making geological explorations including the steps of passing an alternating current of predetermined frequency through the earth between two separated points adjacent the surface of the earth, receiving the potential difference between two points adjacent the earth's surface lying between said current source points, rejecting alternating potentials higher in frequency than the predetermined frequency, rejecting alternating potentials lower in frequency than the predetermined frequency, measuring the remaining potential difference and simultaneously measuring the flow of the alternating current between said separated points adjacent the earth's surface.

4. A method of making geological explorations including the steps of passing a tuned alternating current of selected frequency through the earth from two separated points adjacent the earth's surface, receiving alternating potential differences in sympathy with said alternating current between two points adjacent the earth's surface lying between said first named points, filtering said potential differences to reject those higher in frequency than said selected frequency and those lower in frequency than said selected frequency, amplifying the remaining potential difference, measuring said amplified potential difference and simultaneously measuring the alternating current being passed.

5. A method of making geological explorations including the steps of momentarily passing an alternating current of predetermined frequency through the earth between two separated points adjacent the surface thereof, simultaneously receiving alternating potentials of said predetermined frequency between two points adjacent the earth's surface lying between said current points, rejecting alternating potentials higher in frequency than said predetermined frequency, rejecting alternating potentials lower in frequency than said predetermined frequency, measuring the remaining potential difference, measuring the alternating current being passed and simultaneously recording the alternating current measurements and potential difference measurements whereby resistivity, damping and phase change may be determined.

6. A method of making geological explorations including the steps of passing an alternating current of predetermined frequency through the earth between two separated points adjacent the surface of the earth, receiving a potential difference between two points adjacent the earth's surface lying between said source points, the distance between said receiving points being equal to the distance of each of said receiving points from its nearer current source point, rejecting alternating potentials higher in frequency than the predetermined frequency, rejecting alternating potentials lower in frequency than the predetermined frequency, measuring the remaining potential difference, moving said current source points and said potential receiving points and repeating the above named steps, plotting resistivity curves and correlating said resistivity curves to obtain indication of structure over which the above steps were practiced.

LAWRENCE F. ATHY.
HAROLD R. PRESCOTT.